A. H. VANNAUKER.
DYNAMITE HEATER.
APPLICATION FILED AUG. 7, 1908.
929,902.
Patented Aug. 3, 1909.
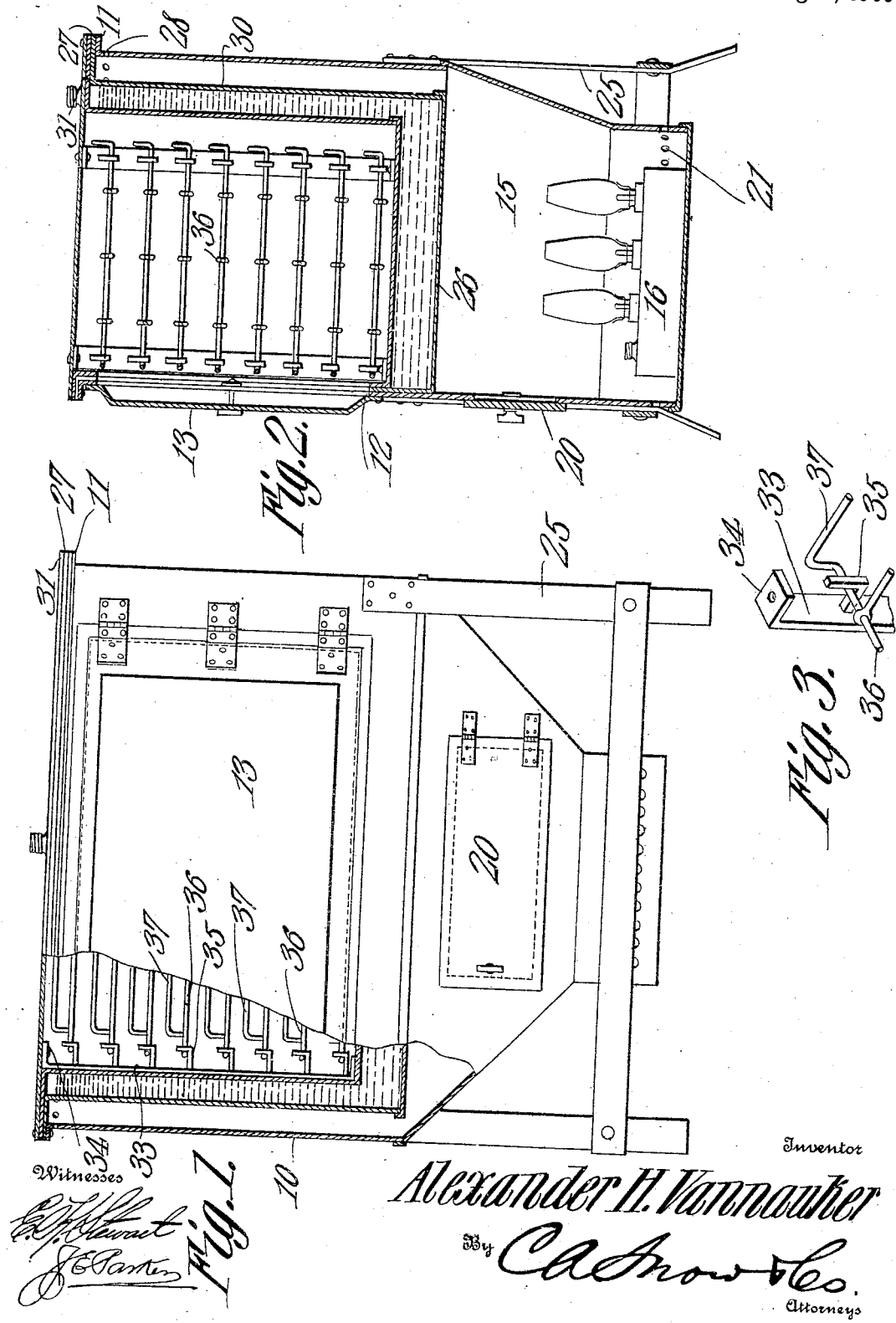
Inventor
Alexander H. Vannauker
By C. A. Snow & Co.
Attorneys

UNITED STATES PATENT OFFICE.

ALEXANDER HARLAND VANNAUKER, OF HAZLETON, PENNSYLVANIA.

DYNAMITE-HEATER.

No. 929,902.     Specification of Letters Patent.     Patented Aug. 3, 1909.

Application filed August 7, 1908. Serial No. 447,464.

*To all whom it may concern:*

Be it known that I, ALEXANDER HARLAND VANNAUKER, a citizen of the United States, residing at Hazleton, in the county of Luzerne and State of Pennsylvania, have invented a new and useful Dynamite-Heater, of which the following is a specification.

This invention relates to devices of that class employed for heating dynamite and has for its principal object to provide an apparatus in which the dynamite may be gradually heated and thawed out without danger of explosure from abnormally high temperature.

A further object of the invention is to provide a dynamite oven that is practically surrounded by a water chamber and is provided with dynamite supporting shelves of such nature as to prevent the sticks of dynamite from coming in contact with the walls of the oven.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a front elevation partly in section of a dynamite heater constructed in accordance with the invention. Fig. 2 is a vertical central section of the same. Fig. 3 is a detail view of a portion of one of the shelves, and shelf supports.

Similar numerals of reference are employed to indicate corresponding parts throughout the several figures of the drawings.

The main casing 10 of the heater is preferably of the generally rectangular shape shown, although in some cases it may be of circular or elliptical form. The top of the casing is provided with an outwardly extending horizontal flange 11 and at the front is an opening 12 which may be closed by a suitable door 13, the door being mounted on hinges in any suitable manner to permit opening to the interior for the insertion or removal of the dynamite. The rear portion of the casing tapers from the opposite ends and the rear to form a combustion or heating space 15, the bottom of which is arranged for the reception of a heating device 16 of any suitable character, that shown in the present instance being in the form of an oil font having a plurality of burners. Access may be had to the heating device by opening the door 20 and air for the supported combustion is allowed to enter through numerous perforations 21 formed in the wall of the casing at a point near the bottom thereof. The casing, as a whole, is supported on suitable legs or standards 25 which are suitably braced and connected in order to properly sustain the weight of the heater and its contents.

Within the casing 10 is suspended another and preferably rectangular casing 26 provided with upper flanges 27 that rest on the flanges 11, and the front wall of the casing 26 is provided with an opening in alinement with the opening 12. The casing 26 constitutes the outer walls of a water containing tank and this casing is spaced from the rear wall and the opposite end walls of the main casing 10 in order to provide a clear space for the circulation of the products of combustion from the heating device, and after such products of combustion impinge against the outer surfaces of the casing 26 and travel up the side and back spaces between the casings 10 and 26, they will escape through a number of discharge openings 28 which extend around the upper portion of the end and rear walls of the casing. Such discharge openings are preferably equi-distantly spaced so as to evenly distribute the products of combustion over the entire surface of the water tank casing 26 exposed to such products of combustion.

Suspended within and forming the inner walls of the water tank is an oven or heating chamber 30 the water in the tank occupying the spaces between the side walls, the back walls and the bottom walls of the oven and casing 26. Thus the water within the tank serves as a water jacket for the oven on the sides, back and the bottom. The oven walls at the top are provided with a horizontally disposed flange 31, this flange resting on the flange 27 of the water tank casing 26 and all three flanges are then firmly riveted together for the purpose of forming a tight joint. The front of the oven is provided with an opening of the same area as and matching or in alinement with the opening 12 of the casing 10, and the three walls which come together at the opening, that is to say the wall of the steam casing, of the water tank casing, and of the oven, are all securely riveted or otherwise fastened together.

The oven 30 is designed to contain the dynamite to be heated or thawed, and heat is transmitted thereto through the body of water in the tank or water jacket while care is taken in the construction of the device that the bottom, rear and end walls of the oven shall be spaced such a distance from the corresponding walls of the casing 26 exposed to the direct action of the products of combustion, that undue heating of the walls of the oven cannot occur.

Arranged against the inner faces of the end walls of the oven are vertical straps 33 having top and bottom flanges 34 which are riveted or otherwise secured to the top and bottom of the oven. From these straps extend shelf supporting hooks 35 which are arranged to receive wire shelves 36. Each shelf is formed of wire twisted in such manner as to form an approximately rectangular frame the two ends of which rest on the hooks 35, and the end members of the frame are united by cross bars 36 on which the sticks of dynamite may rest. The rear wall of the frame is bent upward to form a bar 37 as shown more clearly in Fig. 3 and this bar is spaced a considerable distance from the rear wall of the oven and forms a stop for limiting inward movement of the dynamite sticks when the latter are being placed in position so that it is impossible to force the sticks inward to such an extent as to bring them in contact with the rear wall of the oven and thus expose the same to a dangerous degree of heat. The vertically turned bills of the hooks 35 perform the same function with respect to the side or end walls of the oven and prevent the sticks of dynamite from coming into contact with such side or end walls so that around the three walls of the oven there is a clear space to permit the free circulation of air.

With a heater constructed in accordance with this invention it is practically impossible to expose the dynamite to a dangerous degree of temperature and accidental contact between the sticks of dynamite and overheated walls of the receptacle is positively prevented.

What is claimed is:—

1. In a dynamite heater, a casing provided with draft openings and forming a combustion chamber, the front wall of the casing having an opening, a closed water tank having its bottom portion below said opening, the rear and end walls of the tank being spaced from the similar walls of the casing to form narrow rear and end flues for the products of combustion, an oven suspended within and forming the inner wall of tank, said oven having a front opening in alinement with the opening of the casing, the bottom, rear and end walls of the oven being spaced from the similar walls of the tank, and a door forming a closure for the openings.

2. In a dynamite heater, an oven or receiving chamber, and a plurality of superposed racks arranged therein for the reception of the dynamite, each rack having independent means for preventing contact between the stick of dynamite and the rear wall of the oven.

3. In a dynamite heater, an oven or receiving chamber, and a plurality of independently movable racks disposed therein, the rear portion of each rack being provided with a guard.

4. A dynamite heater including an oven or receiving chamber, hooks projecting from the end walls of the chamber, racks or shelves arranged on said hooks and having upwardly extended rear edges to prevent contact between the dynamite and the rear wall of the oven, the hooks serving as side guards to prevent contact of the dynamite with the end walls of the oven.

5. In a dynamite heater, an oven, straps secured therein and provided with a plurality of hooks, wire racks or shelves carried by the hooks, the rear bars of said racks or shelves being bent upward to form guards, and the bills of the hook serving as side guards to prevent contact between the dynamite and the walls of the oven.

In testimony that I claim the foregoing as my own, I have hereto affixed my signature in the presence of two witnesses.

ALEXANDER HARLAND VANNAUKER.

Witnesses:
A. HARLAND VANNAUKER, Jr.,
GEORGE HARRISON VANNAUKER.